(12) United States Patent
Gerards et al.

(10) Patent No.: US 10,294,896 B2
(45) Date of Patent: May 21, 2019

(54) FLAP DEVICE FOR AN INTERNAL COMBUSTION ENGINE

(71) Applicant: PIERBURG GMBH, Neuss (DE)

(72) Inventors: Hans Gerards, Gangelt (DE); Andreas Grauten, Krefeld (DE); Juergen Michels, Moenchengladbach (DE); Tim Holler, Toenisvorst (DE); Kirill Klass, Essen (DE)

(73) Assignee: PIERBURG GMBH, Neuss (DE)

( * ) Notice: Subject to any disclaimer, the term of this patent is extended or adjusted under 35 U.S.C. 154(b) by 330 days.

(21) Appl. No.: 15/300,782

(22) PCT Filed: Feb. 23, 2015

(86) PCT No.: PCT/EP2015/053741
§ 371 (c)(1),
(2) Date: Sep. 30, 2016

(87) PCT Pub. No.: WO2015/149995
PCT Pub. Date: Oct. 8, 2015

(65) Prior Publication Data
US 2017/0022943 A1 Jan. 26, 2017

(30) Foreign Application Priority Data
Apr. 1, 2014 (DE) .................. 10 2014 104 578

(51) Int. Cl.
*F02M 26/70* (2016.01)
*F02D 9/06* (2006.01)
(Continued)

(52) U.S. Cl.
CPC ............... *F02M 26/70* (2016.02); *F02D 9/04* (2013.01); *F02D 9/06* (2013.01); *F02D 9/106* (2013.01);
(Continued)

(58) Field of Classification Search
CPC ........ F02M 26/54; F02M 26/70; F02M 26/72; F02D 9/04; F02D 9/06; F02D 9/106;
(Continued)

(56) References Cited

U.S. PATENT DOCUMENTS

| 5,148,678 A | 9/1992 | Ueda et al. |
| 6,079,210 A | 6/2000 | Pintauro et al. |

(Continued)

FOREIGN PATENT DOCUMENTS

| DE | 10 2004 046 077 A1 | 4/2006 |
| DE | 10 2004 062 924 A1 | 7/2006 |

(Continued)

*Primary Examiner* — Thai Ba Trieu
*Assistant Examiner* — Diem T Tran
(74) *Attorney, Agent, or Firm* — Norman B. Thot

(57) ABSTRACT

A flap device for an internal combustion engine includes a flow housing which delimits a flow duct, a shaft which rotates, a flap body attached to the shaft in the flow duct, an actuator which rotates the shaft and thereby the flap body in the flow duct, an actuator housing having the actuator arranged therein, a first bearing seat formed on the flow housing, a second bearing seat formed on the actuator housing, a first bearing arranged in the first bearing seat, and a second bearing arranged in the second bearing seat. The shaft projects into the actuator housing. The shaft is mounted at one side via the first bearing and the second bearing.

10 Claims, 2 Drawing Sheets

(51) Int. Cl.
  *F02D 9/10*   (2006.01)
  *F16K 1/22*   (2006.01)
  *F16K 31/53*  (2006.01)
  *F16K 31/04*  (2006.01)
  *F02M 26/54*  (2016.01)
  *F02M 26/72*  (2016.01)
  *F02D 9/04*   (2006.01)

(52) U.S. Cl.
  CPC ........... *F02D 9/107* (2013.01); *F02D 9/1065* (2013.01); *F02M 26/54* (2016.02); *F02M 26/72* (2016.02); *F16K 1/221* (2013.01); *F16K 1/224* (2013.01); *F16K 31/041* (2013.01); *F16K 31/535* (2013.01)

(58) Field of Classification Search
  CPC ........ F02D 9/1065; F02D 9/107; F16K 1/221; F16K 1/224; F16K 31/041; F16K 31/535
  USPC .......................................................... 60/324
  See application file for complete search history.

(56) References Cited

U.S. PATENT DOCUMENTS

| | | | |
|---|---|---|---|
| 6,135,415 A | 10/2000 | Kloda et al. | |
| 6,325,055 B1* | 12/2001 | Yokoyama | F02M 26/58 123/568.24 |
| 6,505,643 B2 | 1/2003 | Scholten et al. | |
| 7,024,852 B2 | 4/2006 | Trapp | |
| 7,503,544 B2 | 3/2009 | Unbehaun et al. | |
| 2006/0059902 A1 | 3/2006 | Gerards et al. | |
| 2007/0240676 A1 | 10/2007 | Sasaki | |
| 2007/0240677 A1 | 10/2007 | Sasaki | |
| 2009/0265084 A1 | 10/2009 | Enomoto | |
| 2009/0317031 A1 | 12/2009 | Pfundt et al. | |
| 2012/0248353 A1 | 10/2012 | Furukawa et al. | |
| 2012/0313025 A1* | 12/2012 | Takai | F16K 27/0218 251/313 |
| 2012/0325183 A1 | 12/2012 | Hatano | |
| 2013/0001882 A1 | 1/2013 | Voigtlaender et al. | |
| 2013/0167815 A1 | 7/2013 | Bareis | |
| 2013/0313460 A1 | 11/2013 | Kobayashi | |
| 2015/0226161 A1 | 8/2015 | Bareis et al. | |

FOREIGN PATENT DOCUMENTS

| | | |
|---|---|---|
| DE | 10 2007 000 221 A1 | 11/2007 |
| DE | 603 11 395 T2 | 11/2007 |
| DE | 10 2006 043 559 A1 | 3/2008 |
| DE | 10 2006 048 713 A1 | 4/2008 |
| DE | 10 2006 053 716 A1 | 5/2008 |
| DE | 10 2008 001 834 A1 | 11/2008 |
| DE | 10 2009 011 951 A1 | 9/2010 |
| DE | 102009011951 * | 9/2010 |
| DE | 10 2010 006 023 A1 | 7/2011 |
| DE | 10 2011 000 101 A1 | 7/2012 |
| DE | 10 2012 204 863 A1 | 10/2012 |
| DE | 10 2012 210 468 A1 | 12/2012 |
| DE | 10 2013 209 755 A1 | 11/2013 |
| EP | 0 972 918 A2 | 1/2000 |
| EP | 1 291 509 A2 | 3/2003 |
| EP | 1 426 589 A2 | 6/2004 |
| EP | 1 911 958 A1 | 4/2008 |
| EP | 2 372 136 A2 | 10/2011 |
| EP | 2 597 294 A2 | 5/2013 |
| JP | 7-238871 A | 9/1995 |
| JP | 11-257104 A | 9/1999 |
| JP | 2012-57547 A | 3/2012 |
| WO | WO 2006/003017 A1 | 1/2006 |

* cited by examiner

FLAP DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2015/053741, filed on Feb. 23, 2015 and which claims benefit to German Patent Application No. 10 2014 104 578.5, filed on Apr. 1, 2014. The International Application was published in German on Oct. 8, 2015 as WO 2015/149995 A1 under PCT Article 21(2).

FIELD

The present invention relates to a flap device for an internal combustion engine comprising a flow housing which delimits a flow duct, a flap body which is arranged rotatably in the flow duct, a shaft to which the flap body is fastened, an actuator via which the shaft and the flap body are rotatable in the flow duct, and an actuator housing in which the actuator is arranged, wherein the shaft projects into the actuator housing and is mounted at one side via a first bearing and a second bearing.

BACKGROUND

Such exhaust flap devices are used, for example, as exhaust retention flaps, as exhaust recirculation valves in low pressure or high pressure exhaust circuits, or as throttle valves in the intake system of internal combustion engines. They serve to control a quantity of exhaust gas to be recirculated to the cylinders, to control the pressure in the exhaust recirculation duct for a reduction of the pollutant emissions of the engine, or to control the quantity of air taken in.

Depending on the installation position, these valves are subjected to different loads both with respect to the incidental quantity of pollutants and the temperatures prevailing. High thermal loads may cause thermal expansions that may lead to a jamming of the shaft in particular in the case of valves arranged in the exhaust gas region. It is further necessary for valves that are not thermally loaded and are supported only at one side to provide a simple rotatability by providing a reliable bearing which avoids misalignment.

DE 10 2007 000 221 A1 describes a flap device which has two bearings arranged at one side of the flap body. The two bearings are arranged in a housing which simultaneously forms the flow housing and the actuator housing. An active cooling by cooling water must correspondingly be provided for such a valve if it is to be used in a thermally loaded region.

DE 10 2009 011 951 A1 therefore describes an exhaust flap device in which the actuator housing is formed separately from the flow housing. Using a mounting frame welded to the flow housing, the two housings are fastened to each other by two radially extending screws, and the flap shaft is connected with the shaft of the actuator by a coupling. The shaft is completely supported in the flow housing at the two axial ends of the shaft. Such a design does not provide that the flow housing is correctly aligned with the actuator housing in order to obtain a correct connection of the drive.

Known designs are therefore disadvantageous in that either a thermal overload must be expected if no active cooling is used, or that it is not possible to provide a correctly aligned connection of the actuator housing with the flow housing or of the existing shafts and to thereby provide the free movement of the actuator and the flap over a long service life. In particular with flaps mounted at two sides, problems may also arise during assembly or by thermal expansions occurring in operation. It is necessary with coupled shafts that both shafts are fully mounted separate from each other when gearings are used.

SUMMARY

An aspect of the present invention is to provide a flap device for an internal combustion engine which may be loaded thermally without active water cooling, is simple to assemble, and which provides a correct connection and alignment of the actuator housing with the flow housing to obtain small positioning forces and to avoid a jamming of the shaft. An additional aspect of the present invention is to use as little installation space as possible and to manufacture the flap device in an economic manner.

In an embodiment, the present invention provides a flap device for an internal combustion engine which includes a flow housing configured to delimit a flow duct, a shaft configured to rotate, a flap body attached to the shaft in the flow duct, an actuator configured to rotate the shaft and thereby the flap body in the flow duct, an actuator housing configured to have the actuator be arranged therein, a first bearing seat formed on the flow housing, a second bearing seat formed on the actuator housing, a first bearing arranged in the first bearing seat, and a second bearing arranged in the second bearing seat. The shaft is configured to project into the actuator housing. The shaft is mounted at one side via the first bearing and the second bearing.

BRIEF DESCRIPTION OF THE DRAWINGS

The present invention is described in greater detail below on the basis of embodiments and of the drawings in which.

DETAILED DESCRIPTION

Figure 1:
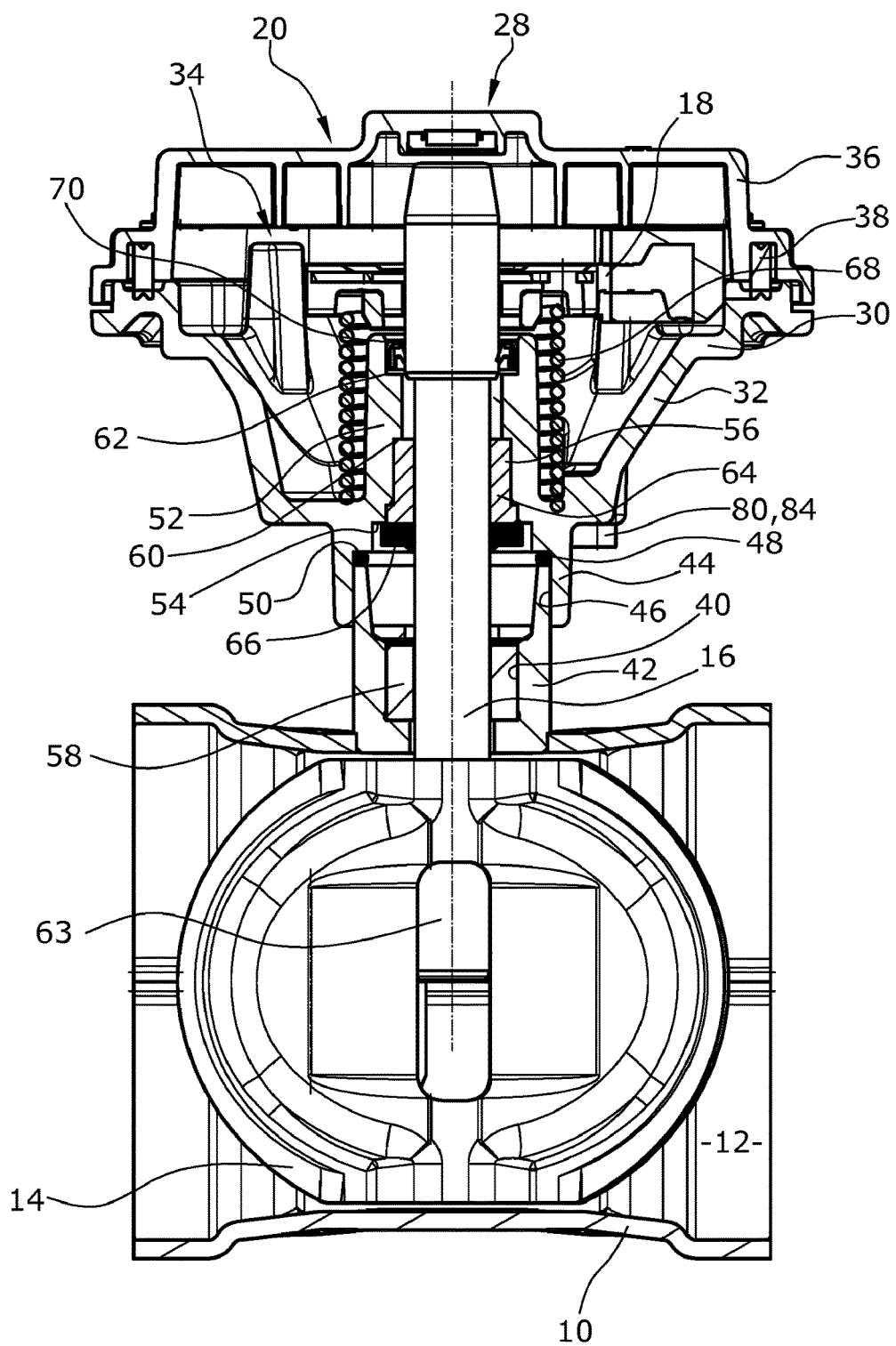
FIG. 1 shows a side view of a first embodiment of a flap device of the present invention in section.

A correct alignment of the shaft with the actuator and thus a free movement of the gearing are provided because the first bearing is arranged in a first bearing seat formed on the flow housing and the second bearing is arranged in a second bearing seat formed on the actuator housing. Mounting the flap at one side also leads to insensitivity to warping caused by thermal load. The connection of the flap with the actuator may also be made in a simple manner so that the assembly can be performed in an economic manner. Such a flap device may nevertheless be manufactured in a particularly economic manner and requires little installation space since an additional mounting for the output shaft of the gearing can be omitted.

In an embodiment of the present invention, a protrusion of the flow housing, in which the first bearing seat is formed, can, for example, abut radially against a receiving element of the actuator housing. A correct axial seating of the actuator housing on the flow housing is thereby provided and a radial offset which could lead to jamming is reliably avoided. This connection also allows for a dissipation of heat from the flap shaft via the actuator housing.

In an embodiment of the present invention, the bearing seat of the actuator housing, the bearing seat of the flow housing, and the receiving element can, for example, have a common central axis so that this connection in the axial direction is made directly via the bearing points of the two housings. Any offset can thereby be excluded.

To provide a sufficient tightness between the housings so that no exhaust gas can escape to the outside along the shaft with such a connection of the housings, the protrusion of the flow housing extends into a receiving opening of the receiving element and abuts axially against a shoulder of the receiving element with interposition of a seal.

In an embodiment of the present invention, the flow housing can, for example, be fastened to the actuator housing by screws to achieve an adjustable and alignable fastening. The actuator can correspondingly be used for different flaps without having to modify the structure.

In an embodiment of the present invention, the flow housing can, for example, be fastened to the actuator housing by two screws, wherein a first screw is arranged coaxially to the shaft axis and a second screw is arranged tangentially to the shaft axis. It is possible with such a fastening to adjust an optimal alignment of the two bearings with respect to each other since both angles and length offsets can be compensated. Bearing clearances with respect to the shaft can also be minimized, whereby sealing is improved and the bearings have a longer service life.

Such an assembly is particularly simple if connecting plates are fastened on the flow housing in which bores are formed for the passage of the screws and if the actuator housing is formed with threaded bores to receive the screws.

In an embodiment of the present invention, a sealing ring which surrounds the shaft can, for example, be arranged axially in the second bearing seat on the side of the second bearing averted from the flap body. An intrusion of hot exhaust gas into the actuator housing can thereby be reliably avoided.

In an embodiment of the present invention, the first bearing and the second bearing can, for example, be designed as slide bearings. These are insensitive to thermal load or contamination. A good thermal connection and thus a good heat dissipation to the actuator housing can also be provided by these bearings.

In an embodiment of the present invention, a bearing bushing serving as an axial bearing and a needle bearing acting as a radial bearing and having radial sealing rings can, for example, be arranged in the second bearing seat. Due to the integrated sealing rings, the needle bearing provides a good sealing of the shaft and a very good radial mounting with little clearance and high load capacity.

In an embodiment of the present invention, a thrust washer can, for example, be fastened on the shaft, which thrust washer is pre-loaded against the second slide bearing or the bearing bushing by a compression spring. The thrust washer is fixedly fastened on the shaft and, together with the spring, causes an axial positional fixation of the shaft and thus of the flap in the duct. The thermal contact with these components is further increased via the contact with the bearing bushing or the slide bearing, whereby an increased heat dissipation is achieved.

An exhaust flap for an internal combustion engine is thus provided which may be used in a hot gas region and by which a free movement of the flap or the shaft can be provided even in the event of thermal warping. The assembly is simple. The flap or the shaft can rotate at low torque by correctly aligning the bearings. Additional bearings can be omitted so that assembly is facilitated and costs reduced.

Two embodiments of exhaust flap devices of the present invention are shown in the drawings and are described below.

The flap devices of the present invention have a flow housing 10 which delimits a flow duct 12. A flap body 14 is arranged in the flow duct 12, via which flap body 14 the flow cross section of the flow duct 12 can be controlled by turning the flap body 14 in the flow duct 12.

For this purpose, the flap body 14 is fastened on a shaft 16 that protrudes through the flow housing 10 into the flow duct 12. At the end opposite the flap body 14, an output gear 18 is fastened on the shaft 16, which is part of a gearing 20 designed as a spur gearing. The gearing 20 is driven by an electric motor 22 when the electric motor 22 is energized in an appropriate manner. An input pinion 26 is fastened on an output shaft 24 of the electric motor 22, which input pinion 26 acts as a drive element of the gearing 20 so that the rotational movement of the electric motor 22 is transmitted as a reduced movement via the gearing 20 to the shaft 16 and thus to the flap body 14.

The electric motor 22 and the gearing 20 thus serve as the actuator 28 of the flap device and are arranged in a common actuator housing 30 formed by a main housing part 32 in which the electric motor 22 and the gearing 20 are mounted, and a cover 36 closing an actuator interior 34, which cover 36 is fastened to the main housing part 32 with the interposition of a seal 38. In order to keep the installation space used as small as possible and to allow for a simple assembling of the electric motor 22 and the gearing 20 in the main housing part 32, the electric motor 22 is arranged in parallel with the shaft 16 and protrudes towards the flow housing 10.

The shaft 16 must be mounted and sealed in a reliable manner both axially and radially to prevent the intrusion of exhaust gas into the actuator housing 30 and to provide a simple rotatability and positioning of the shaft 16 or of the flap body 14 in the flow duct 12. The electric motor 22 must at the same time be protected against excessive thermal load due to the flap device being used in the hot exhaust region.

For this purpose, the flow housing 10 is formed with a first bearing seat 40 in the form of a first hollow cylindrical protrusion 42 that extends towards a hollow cylindrical receiving element 44 on the actuator housing 30. The interior of this hollow cylindrical receiving element 44 forms a radially delimited receiving opening 46 into which the first hollow cylindrical protrusion 42 of the flow housing 10 protrudes, wherein the inner diameter of the receiving opening 46 substantially corresponds to the outer diameter of the hollow cylindrical receiving element 44. Upon assembly, the axial end of the first hollow cylindrical protrusion 42 is pushed against a shoulder-like end 48 of the receiving opening 46 with interposition of an axial seal 50.

The hollow cylindrical receiving element 44 is adjoined by a second hollow cylindrical protrusion 52 of reduced diameter which extends into the actuator interior 34 so that another shoulder 54 is formed between the axially extending hollow cylindrical receiving element 44 and the axially extending second hollow cylindrical protrusion 52. The second hollow cylindrical protrusion 52 of the actuator housing 30 serves as a second bearing seat 56.

A first bearing 58 in the form of a slide bearing is arranged in the first bearing seat 40 of the flow housing 10 for the shaft 16, which first bearing 58 is made of carbon graphite and axially abuts against a wall radially delimiting the shaft passage opening. The shaft 16 extends through the first bearing 58 and into the actuator interior 34 beyond the second hollow cylindrical protrusion 52 extending into the actuator interior 34. The second bearing seat 56 has a cross sectional constriction at the respective opposite ends of which a shoulder 60, 62 is formed. The first hollow cylindrical protrusion 42, the second hollow cylindrical protrusion 52, the hollow cylindrical receiving element 44, as well as the bearings have a common central axis 63 which at the same time is the shaft axis.

In the embodiment of the flap device illustrated in FIG. 1, a second bearing 64, which is a carbon graphite bearing, is arranged radially inside this constricted cross section so that the shaft 16 is mounted at two points at one side of the flap. The axial end of the second bearing 64 directed towards the flap body 14 protrudes slightly beyond the shoulder 54. It thereby becomes possible to press a thrust washer 66, which is fixedly mounted on the shaft 16, against the second bearing 64 by a torsion and compression spring 68 for the axial positional fixation of the shaft 16, and to form an additional sealing that significantly reduces the flow of exhaust gas along the shaft 16 towards the actuator 28.

This torsion and compression spring 68 is arranged in the actuator interior 34 in a manner radially surrounding the second hollow cylindrical protrusion 52 and presses against the output gear 18 fixedly arranged on the shaft 16, so that, together with the output gear 18, the shaft 16 is also loaded in the axial direction. The two end legs of the torsion and compression spring 68 also engage in a manner known per se behind protrusions at the actuator housing 30 and the output gear 18 (not shown in the drawings) so that the shaft 16 is pre-loaded into one direction at least when rotated out of the rest position. The shaft 16 is accordingly rotated into an emergency operating position due to the spring force if the electric motor 22 should fail.

A seal ring 70 is arranged surrounding the shaft 16 at the end of the second hollow cylindrical protrusion 52 directed into the actuator interior, which seal ring 70 axially abuts against the protrusion/shoulder 62 and seals the shaft passage through the second bearing seat 56 in the direction of the actuator interior 34.

Figure 2:
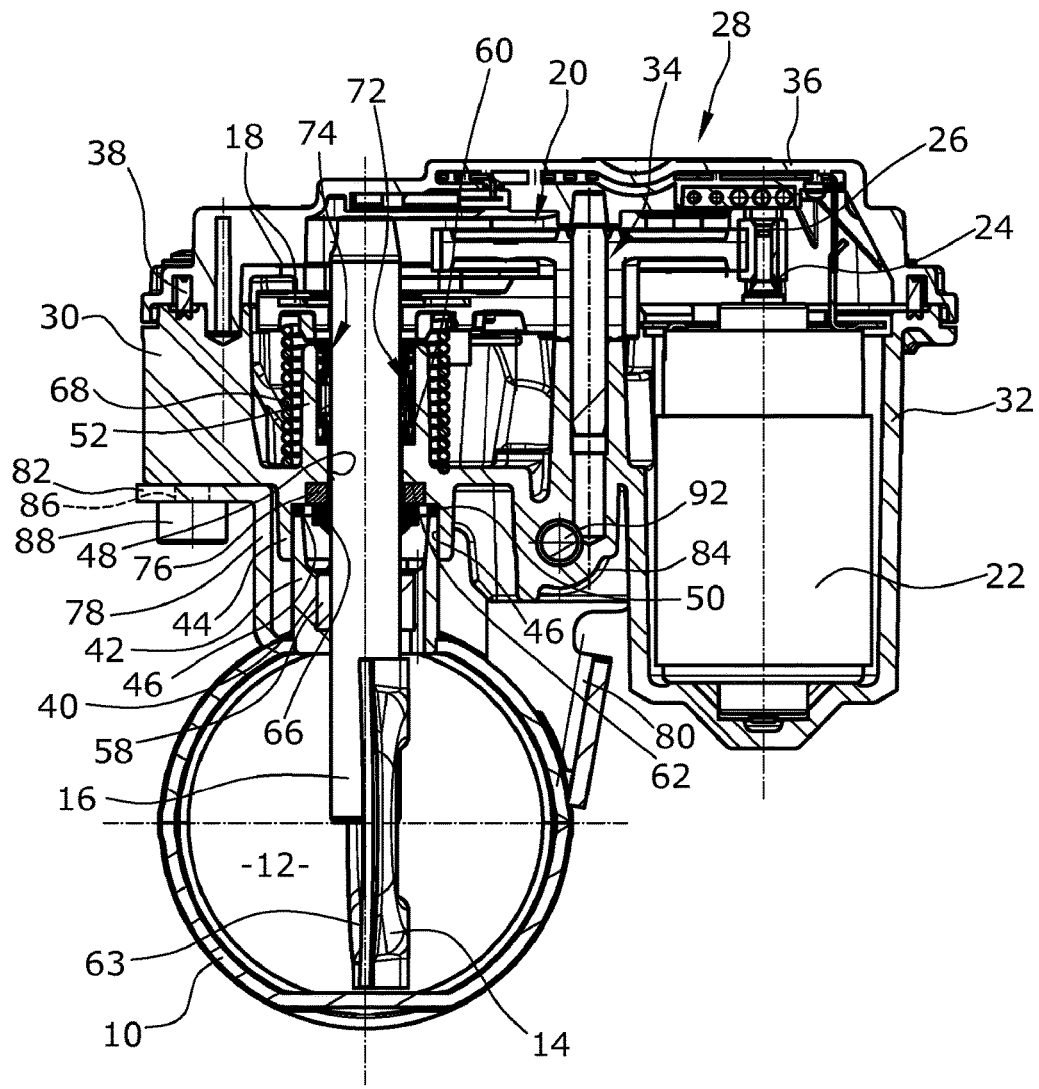
FIG. 2 shows a sectional view of a second embodiment of an exhaust flap device rotated by 90° with respect to the first embodiment.

The embodiment shown in FIG. 2 differs from the above by a modified design of the mounting and sealing. Instead of using the second bearing 64 and the seal ring 70, the sealing and mounting is effected by a combination of a radial bearing in the form of a needle bearing 72 with integrated sealing rings 74 and an axial bearing in the form of a bearing bushing 76.

The needle bearing 72 abuts against the shoulder 62 of the second hollow cylindrical protrusion 52 directed towards the actuator interior 34 and serves as a second bearing 64 for mounting the shaft 16. By the integrated sealing rings 74, the shaft passage in the second hollow cylindrical protrusion 52 is sealed towards the actuator interior 34 so that an intrusion of exhaust gas into the actuator interior 34 is prevented.

The bearing bushing 76 abuts against the shoulder 54 directed towards the flow housing 10 in the region of the second hollow cylindrical protrusion 52 which in this embodiment simultaneously forms the shoulder 60 of the cross sectional constriction. Similar to the second bearing 64 in the first embodiment, the bearing bushing 76 protrudes beyond the shoulder 54, 60 so that the thrust washer 66 is pre-loaded against the bearing bushing 76 by the torsion and compression spring 68 and rotates on the bearing bushing 76 and again minimizes an exhaust gas flow along the shaft 16 towards the actuator 28 and the sealing rings 74.

Both embodiments have in common that a preliminary positioning of the actuator housing 30 with respect to the flow housing 10 is effected by inserting the first hollow cylindrical protrusion 42 of the flow housing 10 into the receiving opening 46 and by the abutment thereof against the shoulder 54. The first bearing seat 40 and the second bearing seat 56 in the actuator housing 30 and the flow housing 10 further provide that the shaft 16 is arranged in an optimal manner with respect to the gearing 20 and the flow duct 12.

However, since both the flow housing 10 and the actuator housing 30 show certain manufacturing tolerances, a slight mutual angular and length offset of the bearings 58, 64, 72, 76 may result, which offset may be increased due to thermal influences. This would result in greater necessary positioning forces and increased wear. This is, however, avoided by the particular fastening of the actuator housing 30 on the flow housing 10.

Connecting plates 78, 80 are fastened on the flow housing 10, for example, by welding. The first connecting plate 78 is bent in a region averted from the flow housing so that its end portion 82 extends vertically with respect to the shaft axis and is in full-surface abutment on the actuator housing 30. The other connecting plate 80 is situated on the radially opposite side of the shaft axis between the electric motor 22 and the shaft 16, wherein the end portion 84 thereof extends in a plane defined by a vector in a radial direction with respect to the shaft axis and a vector extending coaxially to the shaft axis. The end portions 82, 84 are each provided with through-bores 86 into which screws 88 are inserted vertically with respect to the end portions 82, 84, which screws 88 are screwed into correspondingly extending threaded bores 92 in the actuator housing 30. A first screw 88 thus extends coaxially to the shaft axis, whereas a second screw 88 extends tangentially to the shaft axis. The actuator housing 30 is therefore exactly aligned with the flow housing 10, both rotatorily and axially, by being fastened using the screws 88, whereby the fastening leaves no degrees of freedom for a relative movement between the actuator housing 30 and the flow housing 10. The bearings are also correspondingly aligned with each other when the screws 88 are tightened. This kind of fastening also allows, if necessary, for a compensation of existing tolerances so that an exact alignment of the first bearing 58 and the second bearing 64 relative to each other is always possible.

A flap device is thus provided in which an exact mutual alignment of two bearings is provided, of which one is arranged in the actuator housing and one is arranged in the flow housing. A good positioning of the flap body in the duct and a connection of the actuating shaft are thus provided. It is thus possible to use a continuous shaft that at the same time forms the flap shaft and the output shaft of the gearing so that one may do without a plurality of bearings, which in turn results in a simplification of assembly and a smaller required installation space.

It should be clear that the scope of protection of the present invention is not restricted to the embodiments described herein. It is in particular possible to modify the structural design of the housing, the drives, or gearings used, as well as the shapes of the ducts and flaps. Reference should also be had to the appended claims.

What is claimed is:

1. A flap device for an internal combustion engine, the flap device comprising:
   a flow housing configured to delimit a flow duct;
   a shaft configured to rotate;
   a flap body attached to the shaft in the flow duct;
   an actuator configured to rotate the shaft and thereby the flap body in the flow duct;
   an actuator housing configured to have the actuator be arranged therein, the actuator housing comprising a receiving element;

a first bearing seat formed on the flow housing;
a second bearing seat formed on the actuator housing;
a first bearing arranged in the first bearing seat; and
a second bearing arranged in the second bearing seat,
wherein,
the shaft is configured to project into the actuator housing,
the shaft is mounted at one side via the first bearing and the second bearing, and
the flow housing comprises a protrusion in which the first bearing seat is formed, the protrusion being configured to radially abut against the receiving element of the actuator housing.

2. The flap device as recited in claim 1, wherein the first bearing seat formed on the flow housing, the second bearing seat formed on the actuator housing, and the receiving element each have a common central axis.

3. The flap device as recited in claim 1, further comprising:
   a seal,
   wherein,
   the receiving element comprises a receiving opening and a shoulder-shaped end, and
   the protrusion of the flow housing is configured to protrude into the receiving opening and to axially abut against the shoulder-shaped end via an interposition of the seal.

4. The flap device as recited in claim 1, further comprising at least one screw configured to fasten the flow housing to the actuator housing.

5. The flap device as recited in claim 4, wherein the actuator housing is fastened to the flow housing by a first screw and a second screw, the first screw being arranged coaxially to the common central axis, and the second screw being arranged tangentially to the common central axis.

6. The flap device as recited in claim 4, further comprising:
   connecting plates fastened on the flow housing, the connecting plates each comprising a plate bore for a passage of one of the screws, and
   wherein,
   the actuator housing comprises threaded bores to receive the screws.

7. The flap device as recited in claim 1, further comprising a sealing ring configured to surround the shaft, the sealing ring being arranged axially in the second bearing seat on a side of the second bearing averted from the flap body.

8. The flap device as recited in claim 1, wherein the first bearing and the second bearing are designed as respective slide bearings.

9. The flap device as recited in claim 1, further comprising:
   a bearing bushing configured to act as an axial bearing is arranged in the second bearing seat; and
   a needle bearing configured to act as a radial bearing and comprising radial sealing rings is arranged in the second bearing seat.

10. The flap device as recited in claim 9, further comprising:
    a compression spring; and
    a thrust washer fastened on the shaft, the thrust washer being pre-loaded against the second bearing or the bearing bushing by the compression spring.

* * * * *